United States Patent
Kuwayama et al.

(10) Patent No.: US 8,408,777 B2
(45) Date of Patent: Apr. 2, 2013

(54) PLANAR ILLUMINATION DEVICE

(75) Inventors: Tetsuro Kuwayama, Chiba (JP);
Hiromasa Suzuki, Tokyo (JP);
Motosuke Ohmi, Tokyo (JP); Masaru Minami, Kanagawa (JP); Kanji Yokomizo, Kanagawa (JP)

(73) Assignee: Sony Corporation, Tokyo (JP)

( * ) Notice: Subject to any disclaimer, the term of this patent is extended or adjusted under 35 U.S.C. 154(b) by 250 days.

(21) Appl. No.: 12/848,350

(22) Filed: Aug. 2, 2010

(65) Prior Publication Data
US 2011/0038178 A1 Feb. 17, 2011

(30) Foreign Application Priority Data
Aug. 11, 2009 (JP) ................. P2009-186733

(51) Int. Cl.
*F21V 7/04* (2006.01)
*F21V 8/00* (2006.01)
(52) U.S. Cl. ............ 362/616; 362/612; 362/628
(58) Field of Classification Search .......... 362/613, 362/240, 616, 612, 628
See application file for complete search history.

(56) References Cited

U.S. PATENT DOCUMENTS

| | | | | |
|---|---|---|---|---|
| 7,490,963 B2 * | 2/2009 | Fang et al. | | 362/330 |
| 2004/0105250 A1 * | 6/2004 | Leu et al. | | 362/31 |
| 2006/0221638 A1 * | 10/2006 | Chew et al. | | 362/613 |
| 2006/0245213 A1 * | 11/2006 | Beil et al. | | 362/616 |
| 2008/0205080 A1 * | 8/2008 | Erchak et al. | | 362/613 |
| 2010/0271806 A1 * | 10/2010 | Bae et al. | | 362/97.1 |

FOREIGN PATENT DOCUMENTS

| | | |
|---|---|---|
| JP | 2007-213951 | 8/2007 |
| JP | 2009-037744 | 2/2009 |

* cited by examiner

*Primary Examiner* — Joseph L Williams
(74) *Attorney, Agent, or Firm* — K&L Gates LLP

(57) ABSTRACT

A planar illumination device includes: a light guide plate formed by arranging a plurality of unit light guide plates each having a light emission surface as a front surface and a reflection surface as a back surface so that facing end surfaces of adjacent unit light guide plates of the plurality of unit light guide plates are closely arranged; and one or two or more light sources arranged on a side surface, in a direction where the plurality of unit light guide plates are arranged, of each of the plurality of unit light guide plates, in which a projection section is arranged on one of facing surfaces of two adjacent unit light guide plates in the arrangement direction and a recession section in which the projection section is engaged is arranged on the other of the facing surfaces of the two adjacent unit light guide plates.

8 Claims, 5 Drawing Sheets

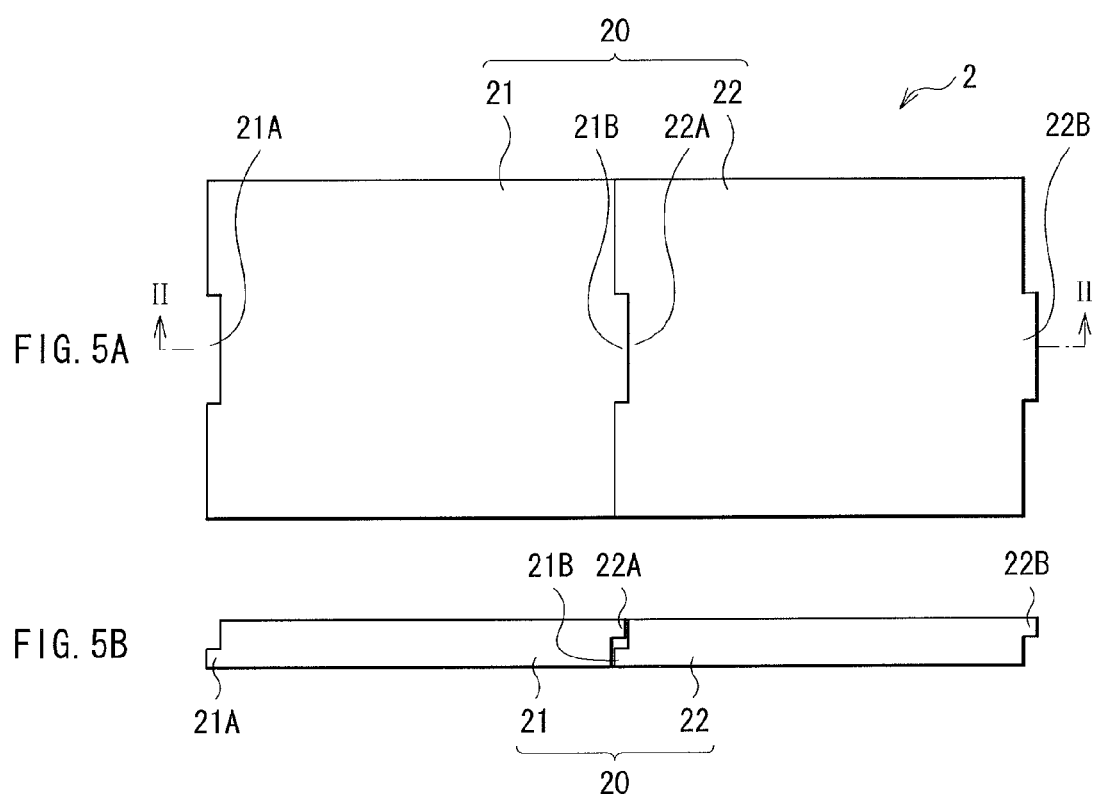

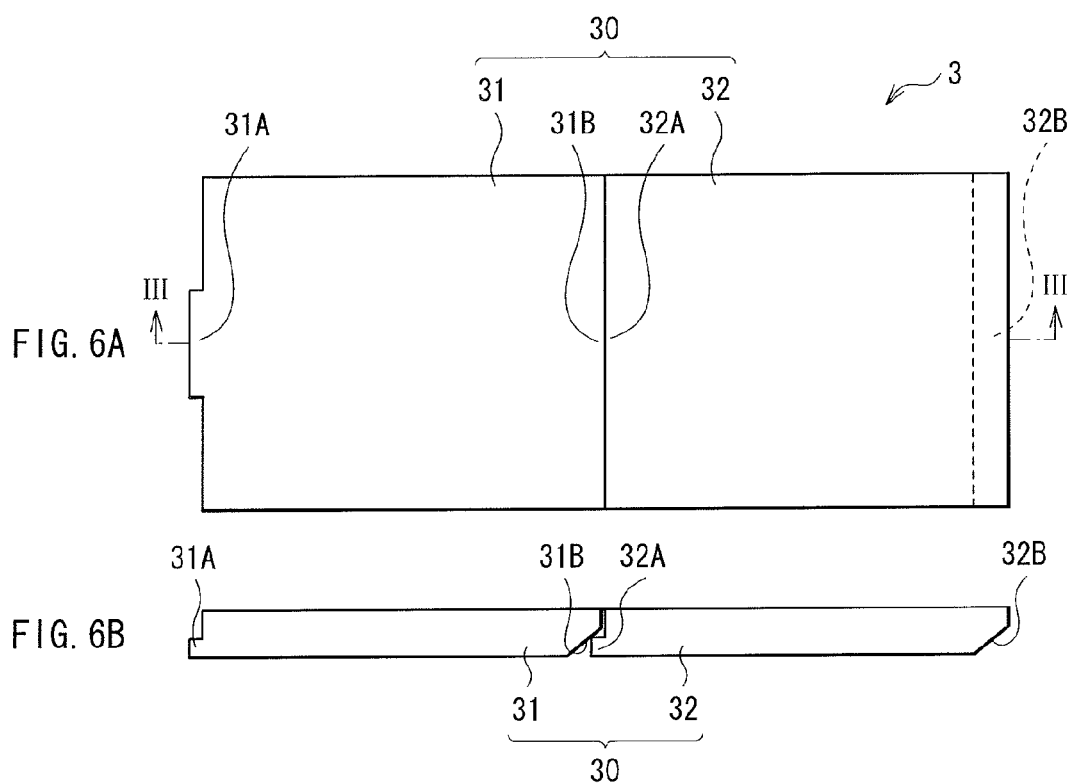

PLANAR ILLUMINATION DEVICE

CROSS REFERENCES TO RELATED APPLICATIONS

The present application claims priority to Japanese Priority Patent Application JP 2009-186733 filed in the Japan Patent Office on Aug. 11, 2009, the entire content of which is hereby incorporated by reference.

BACKGROUND

The present application relates to a planar illumination device performing large surface emission by successively arranging a plurality of unit light guide plates.

In recent years, liquid crystal display panels, advertising panels for indoor and outdoor uses, signboards and the like become larger, and accordingly, thinner and larger planar illumination devices as backlights of these apparatuses are necessary. To achieve a thinner planar illumination device, for example, a light guide plate including a first light guide section and a second light guide section which is thinner than the first light guide section and has a surface recessed toward an emission surface on a side opposite to an emission surface is formed. For example, as described in Japanese Unexamined Patent Application Publication No. 2009-37744, there is proposed a method of arranging a base plate in a recession part recessed toward the emission surface of the second light guide section, and containing the light guide plate and the base plate in a frame made of a thin metal plate. Thereby, a balance between a reduction in profile of the light guide plate and rigidity of a liquid crystal panel is achievable.

With regard to upsizing of a light guide plate, it is difficult to form one large light guide plate, and the cost of forming the large light guide plate is high. Therefore, a method of forming a large surface light source by successively arranging a plurality of unit light guide plates is considered. In this method, the large surface light source is manufactured more easily than a method using a large light guide plate, and cost reduction is achievable. However, in the case where a plurality of light guide plates are successively arranged to form a large surface light source, when the large surface light source emits light, a very small amount of illumination light is leaked from a connection section between the light guide plates to cause scattering in a boundary surface, thereby a bright line may be generated in the connection section.

As one technique for solving such an issue, for example, as described in Japanese Unexamined Patent Application Publication No. 2007-213951, there is proposed a technique in which thin ends which are connection parts of unit light guide plates are formed in a recessed-and-projected shape, and a diffusion sheet is arranged on the unit light guide plates, thereby a bright line leaked from a gap between the connection parts is dispersed.

SUMMARY

Typically, a light guide plate of this kind is manufactured by an injection molding method. A light guide plate manufactured by the injection molding method is formed by introducing a resin into a mold from an inlet called a gate and then molding the resin by application of pressure or heat, but a resin introduction section at the gate is cut off in a later step.

However, in a step of cutting off the resin introduction section at the gate, it is difficult to completely cut off the resin in a gate section, thereby the resin slightly remains. Therefore, in related art, when a plurality of unit light guide plates are successively arranged, a gap between the unit light guide plates is formed due to the remaining resin, thereby light is leaked from the gap to generate a bright line. Even if the leaked light is dispersed by arranging a diffusion sheet on the light guide plate, the leaked light is spread out to reduce the brightness of the leaked light, but a part corresponding to the bright line is clearly and highly visible.

It is desirable to provide a planar illumination device allowed to inhibit bright line generation due to light leakage between unit light guide plates.

According to an embodiment, there is provided a planar illumination device including: a light guide plate formed by arranging a plurality of unit light guide plates each having a light emission surface as a front surface and a reflection surface as a back surface so that facing end surfaces of adjacent unit light guide plates of the plurality of unit light guide plates are closely arranged; and one or two or more light sources arranged on a side surface, in a direction where the plurality of unit light guide plates are arranged, of each of the plurality of unit light guide plates, in which a projection section is arranged on one of facing surfaces of two adjacent unit light guide plates in the arrangement direction and a recession section in which the projection section is engaged is arranged on the other of the facing surfaces of the two adjacent unit light guide plates. More specifically, for example, the projection section corresponds to a remaining part formed when a gate section is cut off in the case where the unit light guide plates are manufactured by injection molding.

In the planar illumination device according to an embodiment, the projection section of one unit light guide plate is engaged in the recession section arranged on a surface, facing the one unit light guide plate, of the other unit light guide plate, thereby the remaining part formed when cutting off the gate section of the light guide plate manufactured by injection molding is avoidable, and adjacent unit light guide plates are arranged sufficiently closely.

In the planar illumination device according to an embodiment, a projection section is arranged on one of facing surfaces of two unit light guide plates arranged adjacent to each other and a recession section in which the projection section is engaged is arranged on the other of the facing surfaces of the two unit light guide plates. Therefore, for example, a remaining part formed when cutting off the gate section of the light guide plate manufactured by injection molding is not sandwiched between two unit light guide plates, and adjacent unit light guide plates are allowed to be arranged sufficiently closely, and light leakage between the unit light guide plates is allowed to be reduced. In other words, bright light generation is allowed to be inhibited.

Additional features and advantages are described herein, and will be apparent from the following Detailed Description and the figures.

BRIEF DESCRIPTION OF THE FIGURES

FIGS. 5A and 5B are a plan view and a sectional view illustrating a light guide plate according to a second embodiment.

FIGS. 6A and 6B are a plan view and a sectional view illustrating a light guide plate according to a modification.

DETAILED DESCRIPTION

The present application will be described in detail below referring to the accompanying drawings according to an embodiment. Descriptions will be given in the following order.

Figure 1:
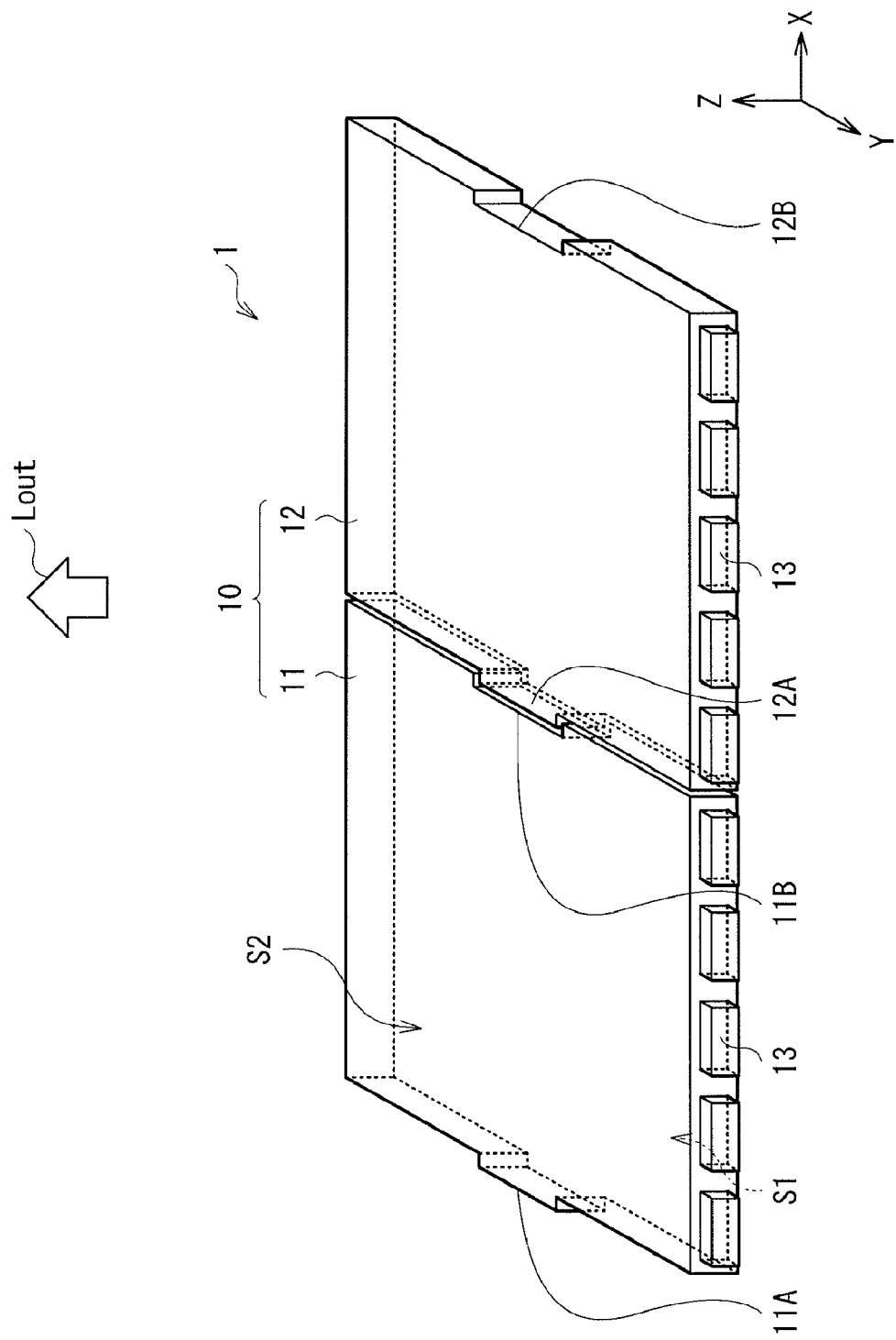
FIG. 1 is a perspective view illustrating a schematic configuration of a planar illumination device according to a first embodiment.

(1) First Embodiment (An example in which a planar surface has a recession and a projection)
(2) Second Embodiment (An example in which a planar surface and a longitudinal sectional surface has a recession and a projection)
(3) Modification FIG. 1 is a perspective view illustrating a configuration of a main part of a planar illumination device 1 according to a first embodiment. The planar illumination device 1 is used as, for example, a backlight of a liquid crystal display or the like, and in the planar illumination device 1, a light guide plate 10 is formed by closely arranging a plurality of unit light guide plates in one or two or more lines. Here, the light guide plate 10 configured of two unit light guide plates 11 and 12 will be described below.

In the planar illumination device 1, a plurality of (in this case, five) light sources 13 are arranged on a side surface along an x direction of each of the unit light guide plates 11 and 12. The unit light guide plates 11 and 12 each have, for example, a rectangular flat shape, and a back surface of each of the unit light guide plates 11 and 12 is a reflection surface 51, and a front surface of each of the unit light guide plates 11 and 12 is a light emission surface S2 emitting emission light Lout.

The unit light guide plates 11 and 12 each propagate and guide light from each light source 13 to the light emission surface S2. The unit light guide plates 11 and 12 are formed of, for example, a glass material, but the unit light guide plates 11 and 12 may be formed of any other material which is allowed to propagate light from the light source 13. In other words, the material of the unit light guide plates 11 and 12 is not limited to a material with high transparency, and the unit light guide plates 11 and 12 may be formed of a light-scattering material or a light-diffusing material in which light-scattering particles are dispersed. Any material including such light-scattering particles may be used, as long as desired optical characteristics are obtained in the light emission surface. These materials include an acrylic resin, polymethyl methacrylate (PMMA), polycarbonate (PC), cyclic polyolefin (COP) and the like. The shapes, sizes, refractive indexes, concentrations, concentration distributions and the like of the unit light guide plates 11 and 12 are arbitrarily adjustable so as to obtain desired characteristics.

As the light sources 13, for example, LEDs (Light Emitting Diodes) or fluorescent lamps are used. The number of light sources 13 for each of the unit light guide plates 11 and 12 may be adjusted depending on, for example, the length of the side surface of each of the unit light guide plates 11 and 12, and is not specifically limited. The positions of the light sources 13 on each of the unit light guide plates 11 and 12 are not limited to only one side surface of each of the unit light guide plates 11 and 12, and the light sources 13 may be arranged on both facing side surfaces, or the light sources 13 may be arranged on not only one side surface but also still another side surface.

Figure 2A:
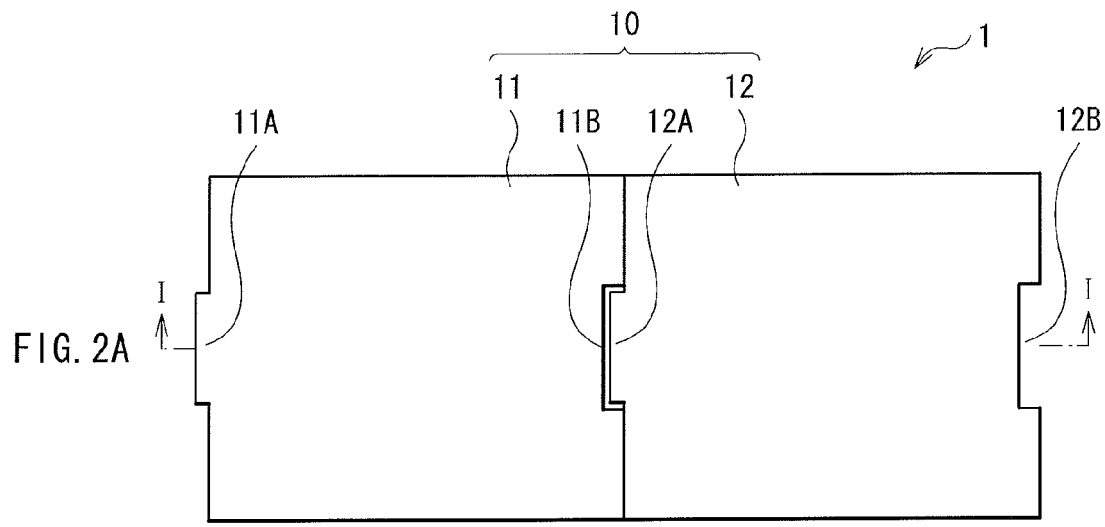
FIGS. 2A and 2B are a plan view and a sectional view illustrating a light guide plate illustrated in FIG. 1.
Figure 2B:
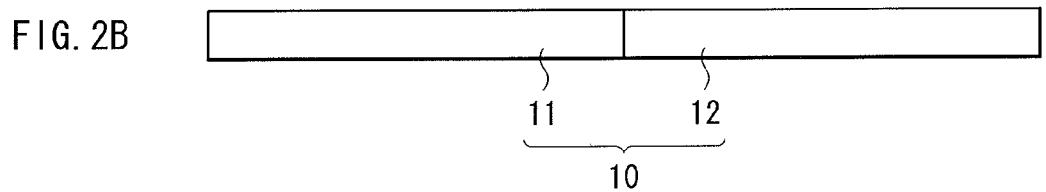

FIG. 2A illustrates a plan view of the unit light guide plates 11 and 12, and FIG. 2B illustrates a sectional view of the unit light guide plates 11 and 12 taken along an alternate long and short dash line in FIG. 2A. Projection sections 11A and 12A are arranged on front end surfaces along an arrangement direction of the unit light guide plates 11 and 12, respectively. The projection sections 11A and 12A each correspond to a remaining part formed in a gate section of a mold in the above-described resin molding. In addition, a gate may be designed to be arranged in any position when manufacturing the light guide plate. Therefore, the positions of the projection sections 11A and 12A are not limited to central positions of front end surfaces of the unit light guide plates 11 and 12, respectively, as illustrated in FIG. 1. On the other hand, recession sections 11B and 12B are arranged on back end surfaces of the unit light guide plates 11 and 12, respectively, so that the projection sections 11A and 12A are engaged in recession sections of adjacent unit light guide plates. The recession sections 11B and 12B are allowed to be formed by changing a mold, but the recession sections 11B and 12B preferably have a size and a shape which allow the projection sections 11A and 12B to be engaged therein without space. The widths, heights and projected amount of the projection sections 11A and 12A are, for example, 10 mm, 1 mm and 0.2 mm, respectively, and the widths, heights and recessed amounts of the recession sections 11B and 12B are, for example, 12 mm, 1.2 mm and 0.3 mm, respectively.

Figure 3:
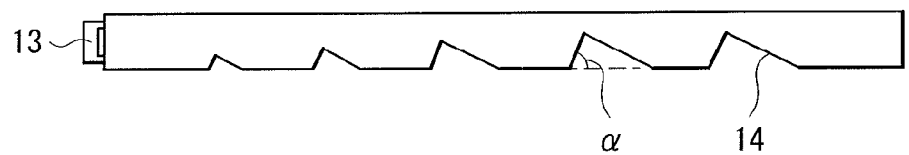
FIG. 3 is a side view illustrating a configuration of a reflection surface of a light guide plate.

As illustrated in FIG. 3, a light guide control section 14 is arranged on the reflection surface S1 of each of the unit light guide plates 11 and 12. The light guide control section 14 controls the guide of light entering from the light source 13 to each of the unit light guide plates 11 and 12. The light guide control section 14 has an inclined surface (an inclined angle α) inclined with respect to the light source 13, and includes a plurality of projection sections 14A extending in an X direction. The inclined angle is an angle which an inclined surface facing the light source 13 forms with a bottom surface. The projection sections 14A of the light guide control section 14 may be arranged at regular intervals or different intervals. The inclined angles α of the plurality of projection sections 14A are, for example, the same as one another. For example, the projection sections 14A are arranged so that the heights H (distances from the bottom surface to the top of a projected structure) of the projection sections 14A gradually increase with distance from the light source 13.

When such a light guide control section 14 is arranged, a uniform light emission strength distribution as a whole light guide plate is allowed to be formed.

Figure 4:
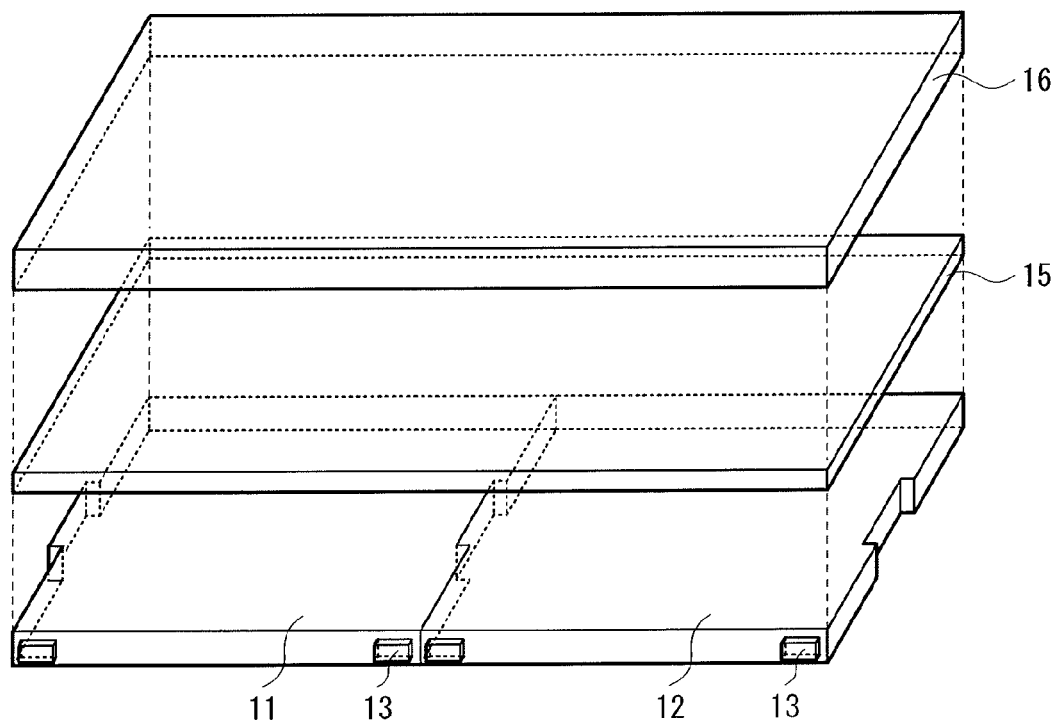
FIG. 4 is a perspective view illustrating a schematic configuration of a liquid crystal display including the planar illumination device according to the first embodiment.

FIG. 4 illustrates a schematic configuration of a liquid crystal display including the planar illumination device 1, and the liquid crystal display includes a diffusion sheet 15 and a liquid crystal panel 16 on the light guide plate 10 configured of the above-described unit light guide plates 11 and 12.

In the planar illumination device 1 according to the embodiment, when each of the plurality of light sources 13 emits light, light enters into each of the unit light guide plates 11 and 12. The light entering into each of the unit light guide plates 11 and 12 is reflected by the reflection surface S1 to propagate through each of the unit light guide plates 11 and 12, and then the light is emitted from the light emission surface S2 of each of the unit light guide plates 11 and 12 through a diffusion sheet (not illustrated), thereby surface emission is performed in the planar illumination device 1.

In this case, each of the projection sections 11A and 12A is arranged in a gate section for an injection molding method on a surface, facing an adjacent unit light guide plate, of each of the unit light guide plates 11 and 12, and the recession sections 11B and 12B are arranged corresponding to the projection sections 11A and 12A, thereby the formation of a resin remaining part in a cutting off step in the injection molding method is avoidable. Thereby, adjacent unit light guide plates 11 and 12 are allowed to be arranged sufficiently closely.

As described above, in the embodiment, each of the projection sections 11A and 12A is arranged in the gate section for the injection molding method on a surface, facing an adjacent unit light guide plate, of each of the unit light guide plates 11 and 12, and the recession sections 11B and 12B are arranged corresponding to the projection sections 11A and 12B. Thereby, a slightly remaining resin when cutting off the gate section is avoidable, and the adjacent unit light guide plates 11 and 12 are allowed to be arranged sufficiently closely. Therefore, light leakage between the unit light guide plates 11 and 12 is allowed to be reduced, and bright light generation in the case where the planar illumination device is used as a backlight of a liquid crystal display or the like is allowed to be inhibited.

Moreover, variations in gate sections formed in the cutting off step are acceptable by adjusting the shapes and sizes of the recession sections 11B and 12B so as to correspond to the projection sections 11A and 12A, and yields are improvable.

Second Embodiment

FIG. 5A illustrates a plan view of a light guide plate 20 of a planar illumination device 2 according to a second embodiment. FIG. 5B illustrates a sectional view of the light guide plate 20 taken along an alternate long and short dash line in FIG. 5A. The light guide plate 20 is configured of two unit light guide plates 21 and 22, and as in the case of the first embodiment, light sources are arranged on a side surface of each of the unit light guide plates 21 and 22, and projection sections 21A and 22A and recession sections 21B and 22B are arranged on facing surfaces in an arrangement direction of the unit light guide plates 21 and 22.

In the embodiment, as in the case of the first embodiment, the projection sections 21A and 22A correspond to remaining parts formed when cutting off gates of the unit light guide plates 21 and 22, but the longitudinal sectional shapes of the projection sections 21A and 22A are different from those in the first embodiment. More specifically, the projection sections 21A and 22A are formed in only upper parts of front end surfaces in the arrangement direction of the unit light guide plates 21 and 22, and accordingly, the recession sections 21B and 22B are formed in only upper parts of back end surfaces of the unit light guide plates 21 and 22 so as to avoid the projection sections 21A and 22A. Even in such a configuration, the unit light guide plates 21 and 22 are allowed to be arranged sufficiently closely.

As described above, in the embodiment, a recessed-and-projected structure (the projection sections 21A and 22A and the recessed sections 21B and 22B) along not only a planar direction but also a vertical direction is arranged in each of the unit light guide plates 11 and 12. Thereby, as in the case of the first embodiment, while the remaining parts in the gate sections when cutting off the gates are avoided, the unit light guide plates 21 and 22 are allowed to be arranged sufficiently closely. Therefore, a gap between the unit light guide plates 21 and 22 is reduced, and bright light generation is allowed to be inhibited.

In particular, in the embodiment, a recessed-and-projected structure along a vertical direction is arranged, so when viewed from above, a gap is not formed between the unit light guide plates 21 and 22, and bright light generation is allowed to be inhibited more effectively.

Although the present application is described referring to the first and second embodiments, the application is not limited thereto, and may be variously modified. For example, in the second embodiment, the longitudinal sectional shape of the recession section arranged in each of the unit light guide plates 21 and 22 is not limited to the shape illustrated in FIG. 5B, and the recession section may have any shape, as long as the recession section is allowed to avoid the projection section 22A. More specifically, as illustrated in FIGS. 6A and 6B, a recession section 31B having an inclined surface is arranged. Even in such a recessed-and-projected structure, the same functions and effects as those in the second embodiment are obtainable.

Moreover, light from the light source 13 is not limited to visible light, and may be nonvisible light such as infrared light or ultraviolet light, and may be changed depending on intended use.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A planar illumination device comprising:
   a light guide plate formed by arranging a plurality of unit light guide plates each having a light emission surface as a front surface and a reflection surface as a back surface so that mating end surfaces of adjacent unit light guide plates of the plurality of unit light guide plates are closely arranged; and
   one or two or more light sources arranged on a side surface other than the mating end surfaces of adjacent light guide plates, of each of the plurality of unit light guide plates,
   wherein a projection section is arranged on one of mating surfaces of two adjacent unit light guide plates in the arrangement direction, and the projection section is matable with a recession section having a void space that is larger than the projection section and is arranged on the other of the mating surfaces of the two adjacent unit light guide plates.

2. The planar illumination device according to claim 1, wherein
   the plurality of unit light guide plates are formed by injection molding, and the projection section corresponds to a remaining part in a gate section for the injection molding.

3. The planar illumination device according to claim 1, wherein
   the light sources are arranged on two side surfaces other than the mating end surfaces of each of the plurality of unit light guide plates.

4. The planar illumination device according to claim 1, wherein the light guide plates are of a substantially uniform thickness.

5. The planar illumination device according to claim 1, wherein the projection sections and the recession sections extend through an entire thickness of the respective light guide plates.

6. The planar illumination device according to claim 1, wherein the projection sections and recession sections extend only partially across a width of the light guide plates in a direction perpendicular to an emission surface of the light sources.

7. The planar illumination device according to claim 1, wherein the projection sections and recession sections are configured such that when adjacent unit light guide plates are closely arranged there is a gap between a lower surfaces of the projection sections and an upper surfaces of the recession sections.

8. A planar illumination device comprising:
a light guide plate formed by arranging a plurality of unit light guide plates each having a light emission surface as a front surface and a reflection surface as a back surface so that mating end surfaces of adjacent unit light guide plates of the plurality of unit light guide plates are closely arranged; and
one or two or more light sources arranged on a side surface other than the mating end surfaces of adjacent light guide plates, of each of the plurality of unit light guide plates,
wherein a projection section is arranged on one of mating surfaces of two adjacent unit light guide plates in the arrangement direction, and the projection section is matable with a recession section that is arranged on the other of the mating surfaces of the two adjacent unit light guide plates, and
wherein the projection sections and recession sections are configured such that when adjacent unit light guide plates are closely arranged there is a gap between a lower surfaces of the projection sections and an upper surfaces of the recession sections.

* * * * *